3,363,006
BIS(2,2,2-TRIFLUOROETHYL)ETHER AND
METHOD OF PREPARATION
John F. Olin, Dayton, Ohio, assignor to Pennsalt Chemicals Corporation, Philadelphia, Pa., a corporation of Pennsylvania
No Drawing. Continuation of application Ser. No. 556,056, Dec. 29, 1955. This application June 20, 1960, Ser. No. 37,035
5 Claims. (Cl. 260—614)

ABSTRACT OF THE DISCLOSURE

Bis(2,2,2-trifluoroethyl) ether is prepared by reacting a 2,2,2-trifluoroethylate of an alkali metal or alkaline earth metal with a 2,2,2-trifluoroethyl ester of an aromatic sulfonic acid preferably in an organic solvent.

This invention relates to a novel fluorinated alkyl ether and to a method for its production. More particularly it relates to bis(2,2,2-trifluoroethyl) ether, $$CF_3CH_2OCH_2CF_3$$

This application is a continuation of Ser. No. 556,056, filed Dec. 29, 1955 and now abandoned.

An object of this invention is to prepare the simple ether of 2,2,2-trifluoroethanol, i.e., one in which both fluoroalkyl groups are alike, in this case $CF_3CH_2$—. 
Another object is to provide a method for the preparation of this novel ether.

Conventional methods for the preparation of an alkyl ether from an alcohol are (1) to dehydrate the alcohol or (2) to prepare a metal alcoholate and react it with an alkyl halide. However, as is known in the art, methods useful for the preparation of alkyl compounds are not always applicable to the preparation of the corresponding fluorinated alkyl compounds. See, for example, chapter 14, "Fluorocarbon Derivatives," in Fluorine Chemistry, by J. H. Simon, vol. I, pp. 463–517. Thus, although the bis(2,2,2-trifluoroethyl) ether of this invention is derived indirectly from its corresponding fluoroalcohol, 2,2,2-trifluoroethanol, neither of the above methods is successful for preparation of this novel ether.

The general procedures used for preparing fluorine-containing ethers have also been found inoperative for the preparation of bis(2,2,2-trifluoroethyl) ether. These include
 (1) Exchange fluorination of chlorine- or bromine-containing ethers,
 (2) Addition of metal alcoholates to fluorine-containing ethylenes,
 (3) Reaction of metal alcoholates with fluorine-containing carbon halides, and
 (4) The electrochemical process using organic ethers.

The fluorinated alcohol, 2,2,2-trifluoroethanol, is uncommonly stable to dehydration. It can be heated in concentrated sulfuric acid without dehydrating to form an ether. It can also be passed over phosphorous pentoxide at 250° C. with no apparent dehydration occurring.

The sodium salt of 2,2,2-trifluoroethanol is equally highly resistant to reaction with an alkyl halide. For example, mixed ethers of 2,2,2-trifluoroethanol have been prepared only under severe conditions, by subjecting sodium 2,2,2-trifluoroethylate with an alkyl halide to elevated temperatures in a pressure bomb for 75 to 125 hours. However, even under similar extreme conditions, the bis(2,2,2-trifluoroethyl) ether is not formed when sodium 2,2,2-trifluoroethylate which also can be called sodium 2,2,2-trifluoroethanolate, is heated at elevated temperatures with 2,2,2-trifluoroethyl chloride or iodide in a pressure reactor.

It has now surprisingly been found that the novel bis (2,2,2-trifluoroethyl) ether can be made rapidly at atmospheric pressure in an ordinary reactor by reacting the metal fluoroalcoholate of 2,2,2-trifluoroethanol with the 2,2,2-trifluoroethyl ester of an aromatic sulfonic acid at elevated temperatures, recovering bis(2,2,2-trifluoroethyl) ether from the reaction products.

The resulting new chemical compound of my invention, bis(2,2,2-trifluoroethyl) ether, is a colorless liquid which vaporizes readily at ordinary temperatures and has useful solvent properties. For example, it may be used to prepare pastes or dispersions of high molecular weight fluorine compounds such as fluorocarbon waxes. It also may be used to soften or solubilize polymeric materials, e.g., synthetic fibres. It is chemically reactive and may be used in the preparation of other fluorinated compounds.

The reaction in the process of this invention is represented by the following equation, in which M is an alkali or alkaline-earth metal selected from the group consisting of sodium, potassium, and lithium alkali metals and barium, calcium and strontium alkaline-earth metals, and R is aryl or substituted-aryl with less than about 20 carbon atoms:

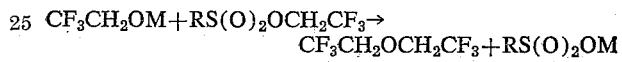

The metal fluoroalcoholates of 2,2,2-trifluoroethanol which are suitable for carrying out the method of this invention are selected reactive alkali and alkaline-earth metal fluoroalcoholates. These include the lithium, sodium, and potassium alkali metal fluoroalcoholates and the barium, calcium and strontium alkaline-earth metal fluoroalcoholates. The fluoroalcoholate of the sodium metal is preferred.

The metal fluoroalcoholate is prepared as a solution or dispersion, depending on its solubility at the reaction temperature, in an inert liquid reaction medium. The selected reaction medium should be inert to the action of sodium and the 2,2,2-trifluoroethyl ester of the sulfonic acid being used. Dioxane is the preferred liquid reaction medium. Other inert organic liquids with sufficiently high boiling points, e.g. above about 60° C., may also be used, e.g., benzene, toluene, xylene, and kerosene. The weight of liquid reaction medium used is about 65% of the total weight of the metal 2,2,2-trifluoroethanol solution and about 40% of the total weight of the ether-formation step reaction mass. The amount used may be varied upward without adversely affecting the practice of this invention. Use of less liquid reaction medium is feasible but less advantageous because of the explosive nature of some concentrated metal 2,2,2-trifluoroethylates at elevated temperatures.

Although the preferred procedures of this invention are carried out in the presence of an added liquid reaction medium, the process can also be carried out in the absence of such added medium by using instead a large excess of 2,2,2-trifluoroethanol.

2,2,2-trifluoroethyl p-toluenesulfonate is the preferred ester for use in the process of this invention. However, the 2,2,2-trifluoroethyl esters of other aromatic sulfonic acids and substituted-aromatic sulfonic acids may be used, e.g., those of benzene-, xylene-, naphthalene-, and anthracenesulfonic acids, and e.g., dodecylbenzenesulfonic acid, and amylnaphthylenesulfonic acid. These esters are readily prepared by reacting the corresponding sulfonyl chloride with 2,2,2-trifluoroethanol by methods known in the art.

The formation of the bis(2,2,2-trifluoroethyl) ether takes place rapidly and can be carried out in a period of from 60 to 600 minutes. A period of about 60 to 180 minutes is preferred.

Reaction of the metal 2,2,2-trifluoroethylate with the 2,2,2-trifluoroethyl ester of an aromatic sulfonic acid can be carried out in the temperature range from about 100 to about 250° C. The preferred temperature range is from about 160 to about 185° C.

The metal 2,2,2-trifluoroethylate can be reacted with the 2,2,2-trifluoroethyl ester of an aromatic sulfonic acid in molar proportions ranging from about 0.01:1 to about 1.5:1 of the former with the latter material. The preferred procedure is to add the ethylate gradually to the ester so that the molar ratio of 1:1 is not exceeded.

In a preferred embodiment of this invention a solution or dispersion of metal 2,2,2-trifluoroethylate containing up to about 40% by weight of alcoholate in an inert liquid reaction medium is prepared by adding a reactive metal to a slight molar excess of 2,2,2-trifluoroethanol with stirring at an elevated temperature below about 140° C. When the metal is substantially reacted, the solution or dispersion is slowly added to about a stoichiometric amount of a 2,2,2-trifluoroethyl ester of an aromatic sulfonic acid heated in a reactor at a temperature between 100 and 250° C. Crude bis(2,2,2-trifluoroethyl) ether is evolved from the reaction mass, recovered, and purified by washing and distillation.

In an advantageous procedure for practicing my invention about 22 parts by weight of 2,2,2-trifluoroethanol in about 40 parts of dioxane are reacted with about 3 parts of metallic sodium above the melting point of the sodium and below about 140° C. to form a solution of sodium 2,2,2-trifluoroethylate. This solution is slowly added with stirring to about 35 parts by weight of 2,2,2-trifluoroethyl p-toluenesulfonate heated in a reactor at a temperature in the range 160–185° C. The product boils off from the reaction mass during the reaction. It is condensed, washed first with acid and then with dilute alkali, dried, and the bis(2,2,2-trifluoroethyl) ether separated out by fractional distillation.

In practicing the method of this invention, it is preferred to add the solution of metal 2,2,2-trifluoroethylate to the hot 2,2,2-trifluoroethyl ester of the aromatic sulfonic acid.

The following example is presented for the purpose of illustrating the invention, it being understood that the invention is not intended to be restricted by this specific embodiment and the description given above, that many different embodiments of this invention may be made without departing from the scope and spirit of it, and that this invention includes all such embodiments. The parts are by weight unless otherwise specified.

*Example*

23 parts of sodium metal were placed in 300 parts of dry dioxane in a reactor equipped with an agitator and reflux condenser. The dioxane was heated to reflux while stirring. 150 parts of 2,2,2-trifluoroethanol were added very slowly in the period of about one hour, or until the sodium was all reacted, to form sodium 2,2,2-trifluoroethylate. 250 parts of 2,2,2-trifluoroethyl p-toluenesulfonate prepared by reacting 2,2,2-trifluoroethanol with p-toluenesulfonyl chloride were placed in another reactor and heated to about 160–185° C. The solution of sodium 2,2,2-trifluoroethylate in dioxane was added very slowly over a period of about 1½ hours. Bis(2,2,2-trifluoroethyl) ether formed continuously and distilled from the reactor with the dioxane into a cooled receiving vessel. The condensed effluent from the reactor was fractionally distilled, yielding 46.5 parts of products boiling at 55–73° C.

The crude product was washed successively with concentrated HCl, 62% $H_2SO_4$, concentrated $H_2SO_4$ and 5% NaOH solution. It was dehydrated over a drying agent and then refractionated in a still. 20 parts of bis(2,2,2-trifluoroethyl) ether were recovered (B.P. 62.5–63.5° C.).

Analysis of the bis(2,2,2-trifluoroethyl) ether showed a molecular weight of 184 (calc. 182), and fluorine content of 62.9% (calc. 62.6%). The specific gravity was 1.3667. Refractive index was 1.2873 (daylight, 25° C.).

Since elemental analysis and the available spectral data cannot distinguish positively between the symmetrical and unsymmetrical structures possible, this compound was examined by nuclear magnetic resonance technique and found to exhibit a spectrum which is consistent with the symmetrical ether structure, $(CF_3CH_2)_2O$, showing it to be bis(2,2,2-trifluoroethyl) ether.

The bis(2,2,2-trifluoroethyl) ether was insoluble in water, but was found quite soluble or miscible in the ordinary organic solvents.

Following procedures substantially as described in the above example the 2,2,2-trifluoroethylates of lithium, potassium, calcium, barium, and strontium can each be reacted with an ester of an aromatic or substituted-aromatic sulfonic acid having less than about 20 carbon atoms, for example with the 2,2,2-trifluoroethyl ester of benzene-, xylene-, naphthalene-, anthracene-, dodecylbenzene-, or amylnaphthylenesulfonic acid, to produce bis(2,2,2-trifluoroethyl) ether.

The term bis(2,2,2-trifluoroethyl) ether has been used to describe the novel fluorinated alkyl ether of this invention. It is to be understood, however, that the ether can also be described as 2,2,2,2′,2′,2′-hexafluorodiethyl ether.

I claim:
1. Bis(2,2,2-trifluoroethyl) ether, a liquid having a boiling point of about 63° C.
2. A process for the preparation of bis(2,2,2-trifluoroethyl) ether which comprises contacting a solution of metal fluoroalcoholate selected from the group consisting of the 2,2,2-trifluoroethylates of lithium, sodium, potassium, barium, calcium and strontium in an organic solvent, said solvent selected from the group of organic liquids consisting of dioxane, benzene, xylene, toluene, refined kerosene, and 2,2,2-trifluoroethanol, with the 2,2,2-trifluoroethyl ester of an aromatic sulfonic acid having less than about 20 carbon atoms per acid molecule, at a temperature of at least 100° C., and recovering said ether.
3. A process for the preparation of bis(2,2,2-trifluoroethyl) ether according to claim 2 in which the metal fluoroalcoholate of 2,2,2-trifluoroethanol is sodium 2,2,2-trifluoroethylate.
4. A process for the preparation of bis(2,2,2-trifluoroethyl) ether according to claim 2 in which the 2,2,2-trifluoroethyl ester of an aromatic sulfonic acid is 2,2,2-trifluoroethyl p-toluenesulfonate.
5. A process which comprises reacting 2,2,2-trifluoroethyl p-toluene sulfonate with an alkali metal 2,2,2-trifluoroethanolate and obtaining 2,2,2,2′,2′,2′ - hexafluorodiethyl ether as a product therefrom.

References Cited

Henne et. al.: J. Amer. Chem. Soc., vol. 72, pp. 4378–4380 (1950).

LEON ZITVER, *Primary Examiner.*

H. MOORE, H. MARS, *Assistant Examiners.*